United States Patent [19]
Grant

[11] Patent Number: 4,673,771
[45] Date of Patent: Jun. 16, 1987

[54] UNIVERSAL BUILDING ENTRANCE TERMINAL

[75] Inventor: Michael L. Grant, Crawford, Nebr.

[73] Assignee: U.S. West Enterprises, Inc., Minneapolis, Minn.

[21] Appl. No.: 860,656

[22] Filed: May 7, 1986

[51] Int. Cl.$^4$ ............................................. H02G 3/22
[52] U.S. Cl. ....................................... 174/38; 174/48; 361/358
[58] Field of Search .............................. 174/38, 48, 60; 361/356, 358, 359, 360; 220/3.3, 3.7, 18

[56] References Cited

U.S. PATENT DOCUMENTS

| | | | |
|---|---|---|---|
| 2,968,689 | 1/1961 | Johnson | 174/48 |
| 3,025,432 | 3/1962 | Giegerich | 174/48 X |
| 3,796,822 | 3/1974 | Eickman | 174/48 |
| 3,936,589 | 2/1976 | Teeters, Sr. et al. | 174/38 X |
| 3,996,415 | 12/1976 | Provorse | 174/48 |

Primary Examiner—Laramie E. Askin
Attorney, Agent, or Firm—Merchant, Gould, Smith, Edell, Welter & Schmidt

[57] ABSTRACT

A universal building entrance terminal for providing telephone connections for a building includes a housing for positioning adjacent the building partially buried in the ground, removable closure panels and a hinged component mounting panel for ease in making or changing cable or telephone connections. Removable side access panels are provided so that multiple units can be positioned side by side and cabling connected therebetween to expand system capability. Multiple normally covered access openings are provided, and access plates having variable length mounting flanges and offset openings are provided for alignment with, and weatherproof connection to, contractor-provided cable access openings in buildings.

10 Claims, 8 Drawing Figures

UNIVERSAL BUILDING ENTRANCE TERMINAL

FIELD OF THE INVENTION

This invention pertains generally to the field of telephone equipment, and in particular to weather-proof terminal cabinets for telephone service entrances to buildings for housing cables, splices, protectors, terminal blocks and related components.

BACKGROUND OF THE PRIOR ART

In providing telephone service to buildings, particularly larger commercial buildings, it is usually necessary to provide a telephone service entrance to the building to provide interconnection between a telephone company cable leading up to the building and telephone wiring and cabling within the building. For various reasons it is desirable to have this interconnection at the exterior of the building. This saves space within the building, and also eliminates the need for providing access within the building to telephone service personnel on a continuing basis, for example whenever lines are reassigned within the building to new tenants. Keeping such activities exterior to the building affords the building owner or tenant greater flexibility and freedom in use of the interior space.

For typical commercial buildings, a buried telephone company cable, for example a 600-pair cable, is brought up to an outside wall of the building, and the contractor for the construction of the building provides internal telephone cabling which is routed internally of the building to the wall adjacent the end of the buried telephone cable. A terminal or cabinet is then needed adjacent the outside of the building to make the connections between the telephone company cable and the internal wiring and cabling. The cabinet must of course be weatherproof, relatively secure and ponder sufficient interior space for splices, terminal blocks, lightning protectors and other associated equipment which may be required. Numerous cabinets for this purpose are available in the prior art.

However, existing telephone service entrance cabinets are subject to numerous disadvantages, primarily in their lack of flexibility in adapting to different mounting and connection requirements for different types of buildings. For example, when providing telephone service to new buildings, it is obvious that the size of the building and the number of telephone customers within a building will vary greatly from one building to the next. In the past this has meant that it was necessary to stock more than one size of service entrance cabinet, which creates additional complexity and cost. Also, if there is a great increase in the telephone use within a building after it is constructed, the previously-installed service entrance cabinet may be too small to handle additional cables or connections, necessitating a costly removal and replacement of the entire service entrance.

Another problem with existing service entrance cabinets is that they are inconvenient to work on when it is necessary to gain access to the terminal blocks for adding, deleting or changing subscribers' telephone lines. In many commercial buildings, for example shopping centers, there may be changes on a more or less continuous basis, for example when tenants open business, close or move to a different location within the building. With existing service entrance cabinets, a considerable amount of disassembly is required to gain access to the connections, thus requiring additional servicemen's time.

Another difficulty with existing cabinets is a lack of flexibility in positioning and mounting of different components within the cabinet, since most have prepunched or predrilled metal mounting panels which are designed to accept predetermined components and terminal blocks. This causes difficulties and on-site reworking if the customer decides to mount different terminal blocks or components from that for which the cabinet was designed, or if conditions and usage change requiring additional or different components.

A further problem is that the actual position of the contractor-provided cable access opening in the building may be off several inches or more in any direction from that which was specified in the original building plans. Since the terminal cabinet is intended to be mounted on and partially buried in the ground, installation difficulties can arise when the access opening in the building and the access opening provided in the cabinet do not align, which may necessitate a considerable amount of time in repositioning the cabinet, enlarging its opening or the like.

SUMMARY OF THE INVENTION

The present invention overcomes these and other problems with existing telephone service entrance terminal cabinets by providing a modular construction that has great flexibility in positioning or changing of different types of components within the cabinet, that provides easy access to terminal areas for changing of connections, and which provides multiple and adjustable openings for easy alignment with cable entrance openings in buildings even if they are mispositioned. The modular feature of the invention allows convenient and simple on-site assembly of multiple cabinets, either at the time of the original installation or at a subsequent time when telephone demand increases within the building, to expand the available terminal space without having to tear out or remove the original cabinet.

DETAILED DESCRIPTION OF THE PREFERRED EMBODIMENT

The construction of the preferred embodiment of the invention will be described herein with reference to the several views of the accompanying drawing, in which the same reference numbers are used for the same parts in the various drawing figures.

Figures 1, 8:
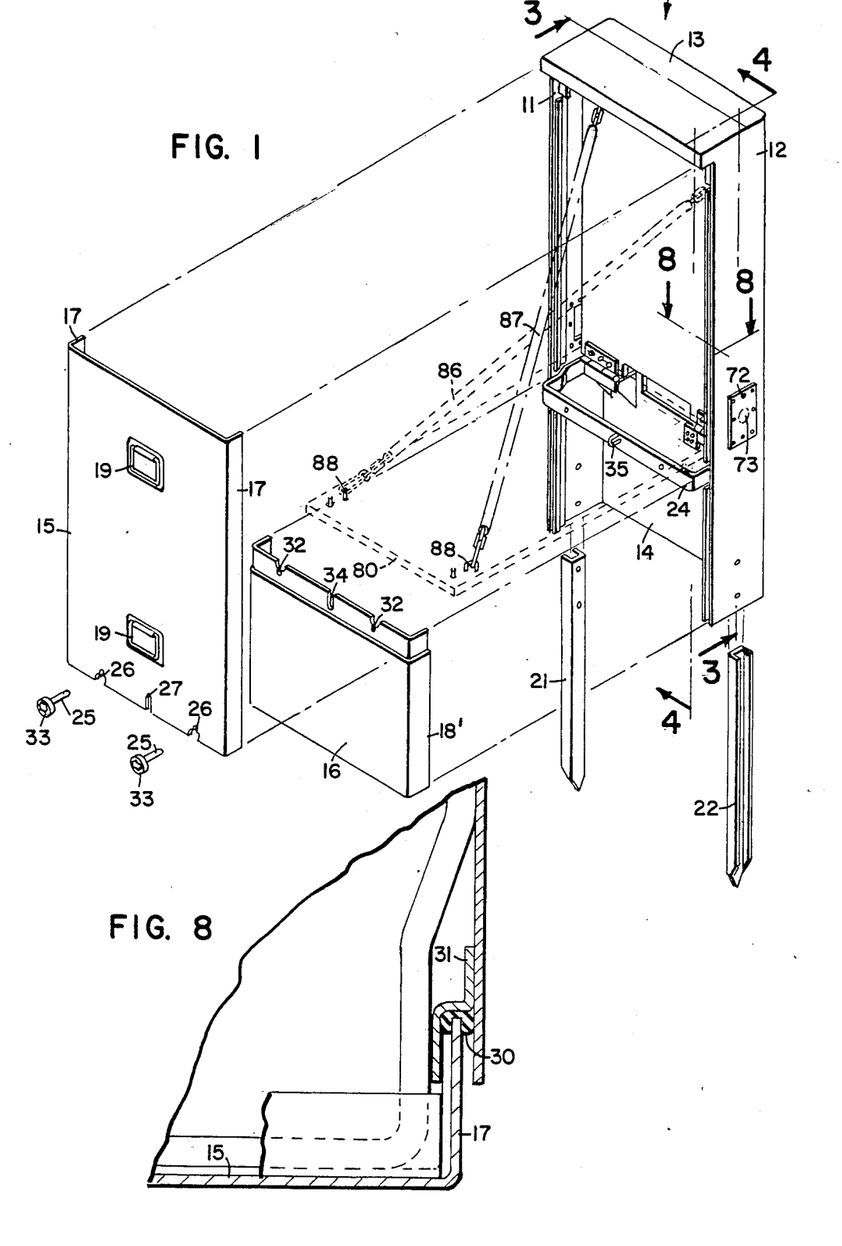
FIG. 1 is an exploded perspective view of a cabinet according to the present invention.
FIG. 8 is an enlarged sectional detail view as seen along line 8—8 of FIG. 1.
Figure 4:
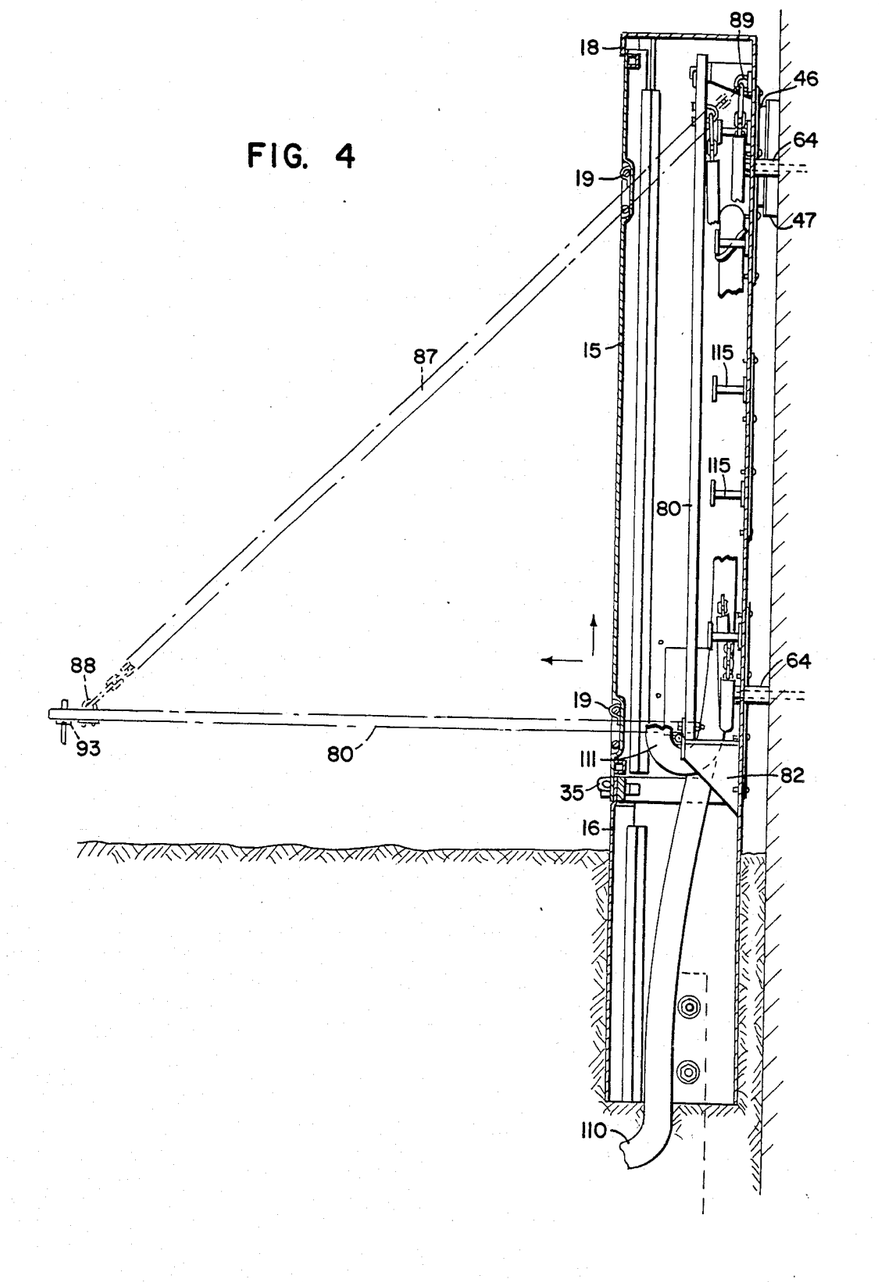
FIG. 4 is a vertical section seen along line 4—4 of FIG. 1 on an enlarged scale.

As seen in the exploded perspective view of FIG. 1, the universal building entrance terminal according to the preferred embodiment of the invention comprises a rectangular elongate housing 10. Housing 10 is intended to be vertically positioned adjacent a building with the lower portion thereof partially buried in the ground or terrain to receive the end of the buried cable as seen in FIG. 4. Housing 10 comprises side panels 11 and 12, back panel 14 and top panel 13. The back and sides can be integrally formed and the top welded thereto. The housing is preferably made of steel with a suitable finish to withstand environmental exposure. In the preferred embodiment, the cabinet housing is made of 14 gauge cold rolled steel, zinc plated and finished with a vinyl wash prime, epoxy primer and acrylic paint.

Anchor stakes 21 and 22 are bolted or otherwise secured to the lower portions of side panels 11 and 12, respectively. When the cabinet is placed in position in the ground, the anchor stakes extend down into the soil to help stabilize the housing.

Mounting bar 24, which is generally U-shaped, is secured to the insides of side panels 11 and 12, as by welding, and extends across the open side of the housing to receive and secure upper closure panel 15 and lower closure panel 16. These panels are preferably made of the same material and have the same coatings as that of housing 10.

Upper closure panel 15 is mounted to housing 10 and held in place by a lip portion 18 of top panel 13 (seen in FIG. 4), and the lower end of panel 15 is held in place by bolts 25 which secure to mounting bar 24. Panel 15 has side flange portions 17 which fit inside side panels 11 and 12 and engage a resilient seal 30 which is held in place by retaining flange 31, as seen in FIG. 8. Retaining flange 31 is welded or otherwise secured to the insides of side panels 11 and 12 both above and below mounting bar 24, and the resilient seal is captured between flange 31 and flange 17 of the panel, to form a weatherproof seal. Handles 19 can be provided on upper closure panel 15 for convenience in removing and installing the panel.

Lower closure panel 16 similarly has side flange portions 18' which engage resilient seal 30 and retaining flanges 31 below bar 24. Closure panel 16 is similarly held in place by bolts 25 to mounting bar 24. The upper portion of panel 16 is stepped or indented so that the lower portion of panel 15 may mount flush thereto, as seen for example in FIGS. 1 and 4. The lower edge of upper closure panel 15 has a pair of slots 26 which fit over bolts 25, and a central slot 27 which clears lock hasp 35 secured to the center of mounting bar 24. Similarly, the upper edge of lower closure panel 16 has slots 32 which receive bolts 25, and center slot 34 which receives hasp 35.

To assemble the housing, panel 16 is put in place with bolts 25 passing through slots 32 and into mounting bar 24. The lower portion of lower closure panel 16 is partially embedded in the ground which helps keep it closed. The inside of the housing below the terrain line can be filled with fine gravel.

Figure 6:
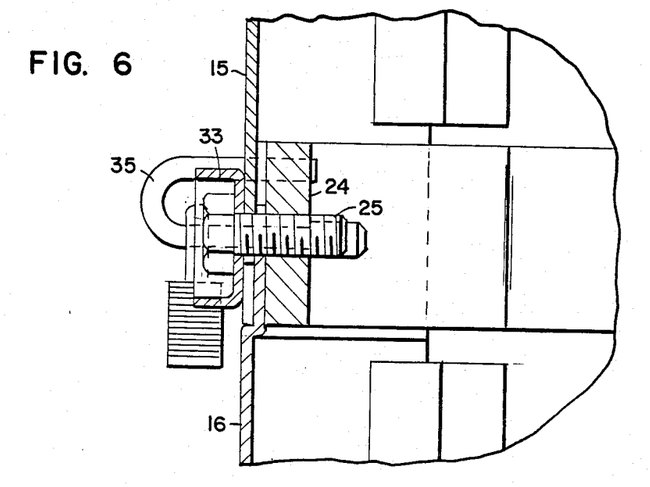
FIG. 6 is an enlarged sectional detail view as seen along line 6—6 of FIG. 5.

Upper closure panel 15 is put in place by first inserting the upper edge behind the lip 18 of top panel 13, then moving the lower edge of panel 15 up against the top edge of lower closure panel 16, which overlies mounting bar 24, and allowing closure panel 15 to drop down slightly so bolts 25 are received in slots 26. After this the bolts can be tightened, and a padlock attached through hasp 35 for additional security. Preferably, bolts 25 have collars or flanges 33 (as seen for example in FIG. 6) which discourage tampering by preventing access by normal open end wrenches and require a socket wrench for removal. Preferably slots 26 and 32 have a widened or rounded portion near the panel edges to permit swinging the panels past the bolt flanges 33 for removal, without requiring complete removal of the bolts.

Figure 3:
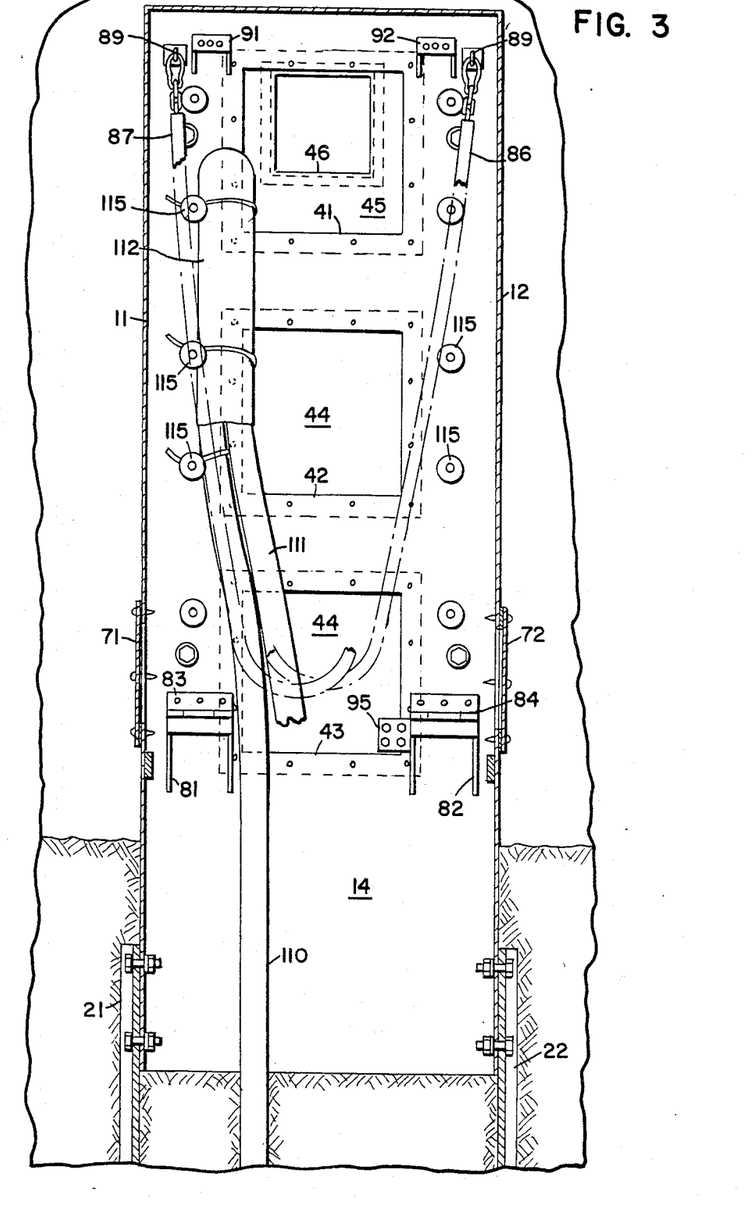
FIG. 3 is a view similar to FIG. 2 but with further portions removed, taken generally along line 3—3 of FIG. 1 on an enlarged scale.

As seen in FIG. 3, back panel 14 of housing 10 provides means for access to the building. Specifically, a number of different openings are provided, and provisions are made for adjustment of the opening to match the position of the building access opening and also to accommodate differences in spacing from the building. Specifically, as seen in FIG. 3, three separate square openings 41, 42 and 43 are provided at different heights. Each is normally covered by a plate, for example square plates 44 which are shown in FIG. 3 as covering openings 42 and 43. These plates are bolted to back panel 14 to cover the openings, but can be easily removed in the field for installation. As shown in FIG. 3, plates 44 are on the two lower openings and the upper opening 41 is used for the entrance to the building, but it will be understood that any of the openings could be used depending upon mounting height for a particular installation.

As seen in FIG. 3, opening 41 is partially closed with access plate 45 which has an offset opening 46. It will be appreciated from FIG. 3 that by mounting access plate 45 in any of the four possible orientations, offset opening 46 can be positioned slightly up, down, left or right as required to make final adjustments for alignment with the access opening provided by the contractor in the building. This is an important feature, as it alleviates difficulties that have occurred in the prior art in obtaining precise alignment due to variances in the location of the opening provided by the contractor, and due to slight irregularities that may occur in mounting the cabinet to the ground.

Figure 5:
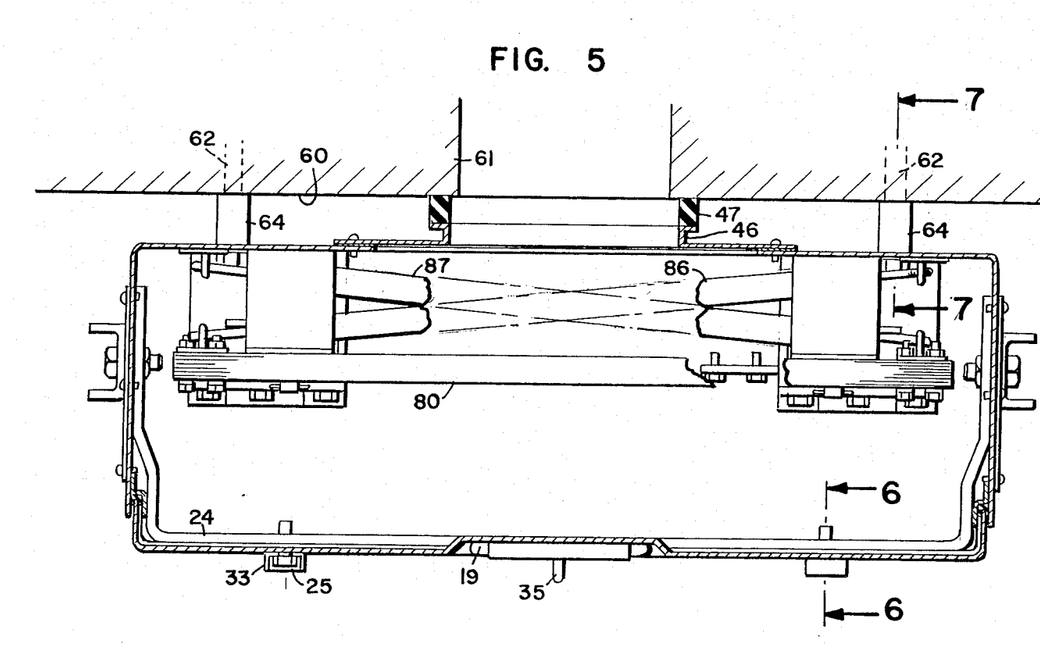
FIG. 5 is an enlarged horizontal sectional view taken along line 5—5 of FIG. 2.

Access plate 45 includes a flange 46, as seen in FIG. 5, that projects from the back of the cabinet toward the building. The back panel 14 of the terminal housing is spaced apart from the building wall 60, and this space is taken up by flange 46 and resilient seal 47 which is secured thereto. In this manner a secure and weatherproof opening is provided between the building, via the contractor-provided building access opening 61, and the interior of the building entrance terminal housing.

The amount of space between the back panel 14 and the building wall 60 may vary for different installations depending on a number of factors. For example, different types of exterior siding of buildings, and different types of foundations may dictate how closely the housing can be positioned to the building, and this in turn may determine the amount of the spacing. For this purpose, a number of different access plates 45 are provided, with the difference among them being a different length of flange portion 46. Thus, if the entire unit were spaced further from the building than shown in FIG. 5, an access plate 45 having a larger flange 46 would be used, so that the secure abutment of resilient seal 47 with the building would still be achieved.

Figure 7:
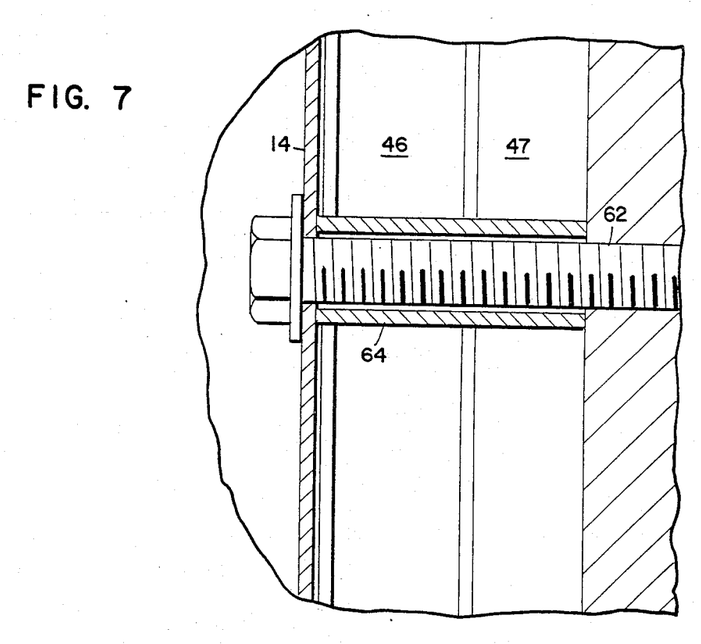
FIG. 7 is an enlarged sectional detail view as seen along line 7—7 of FIG. 5.

The upper portion of the terminal is secured to the building by means of mounting bolts or lag bolts 62, which pass through holes provided for that purpose in back panel 14. Because of the space between the back panel and the building wall, and the provision of mounting flange 46, standoff spacers 64 are provided over bolts 62 to prevent over-tightening of the bolts in a way that might pull too close towards the wall and bend the back panel. A detail of standoff 64 is seen in FIG. 7. Standoff spacers 64 are sized proportionate to the size of flange 46 being used, so that a plurality of lengths of standoff are provided to accommodate different wall spacings.

According to a modular feature of the invention, two or more of the building entrance terminals can be mounted side by side and interconnected to expand the capability to accommodate a given job. This is convenient when installing telephone building entrance terminals on new construction since only one size of terminal cabinet is required and different capacities can be accommodated by using additional units. It is even more important in expanding capacity in a given installation, so that an additional cabinet can be mounted side by side adjacent the existing one and it is not necessary to tear out the old one to replace it with a larger one.

According to this feature, the housing 10 includes a pair of side access panels 71, 72 in side panels 11, 12 respectively. These cover access holes and are normally held in place by screws, and have knockout openings 73. When installing two units side by side, they are physically mounted close together and the adjoining knockouts 73 can be removed. Or, for access for larger cables, the adjoining side access panels 71 or 72 can be removed. A resilient seal similar to seal 47 in FIG. 5 is placed between and in contact with the units surrounding the side access openings. Then cables can be passed between the two units and connections made as required, thus providing expanded capacity.

While the unit is particularly adapted to positioning adjacent buildings to form the telephone service entrance therefor, the unit can also be used as a stand alone interconnect access cabinet. In this case all of the access openings 41, 42 and 43 would normally be covered by plates 44. Again, if extended capacity is required, a plurality of the terminal units can be positioned side by side and interconnected through adjoining knockouts 73 or side access panels 71, 72.

The building entrance terminal of the present invention includes a mounting board 80 which is intended to support the components such as a lightning protector, terminal block assembly and the like. The mounting panel is indicated by reference number 80, and is seen in phantom line in FIG. 1 in its folded out position, and is seen in FIGS. 4 and 5 in its normal position within the cabinet. The mounting of mounting panel 80 within the cabinet is shown in FIG. 4, and also FIG. 3 in which the mounting panel itself has been removed for illustrative purposes. A pair of hinge mount brackets 81 and 82 are secured as by bolting to back panel 14 of the housing, approximately behind mounting bar 24. Hinges 83 and 84 are secured thereto, and the bottom edge of mounting panel 80 is secured to the hinges for support, and for permitting the mounting panel to swing down to an approximately horizontal position to permit access behind the panel, as indicated in broken line in FIG. 4. A pair of panel support chains 86, 87 are provided to support the panel when it is in the horizontal access position. Chains 86, 87, which are preferably covered by plastic sleeves to avoid damaging anything within the cabinet, connect between loops 88 secured near the top edge of mounting panel 80 and loops 89 mounted near the top of housing 10. Brackets 91 and 92 are secured to back panel 14 near the top thereof and are positioned to abut the upper end of mounting panel 80 when it is in its normal vertical position. Quick release fasteners 93 and 94 secure the upper end of mounting panel 80 to brackets 91 and 92, respectively to hold it in place. A simple turn of quick release fasteners 93 and 94 releases them to permit folding out of the panel.

In the preferred embodiment, mounting panel 80 is plywood, not prepunched steel as in prior art terminal cabinets. The problem with prepunched steel mounting boards is that the hole patterns assume a particular type of terminal block assembly, but if the installing organization prefers a different type or different arrangement of terminal blocks, it is necessary to drill new holes, which can be a time consuming process. The provision of a plywood mounting panel in the preferred embodiment makes it much easier to mount any type of terminal block assembly or components by the use of simple wood screws.

A ground plate 95 is provided with a number of attachment positions for ground wires from components within the cabinet, and for connecting an appropriate ground wire to the building in accordance with local codes.

Figure 2:
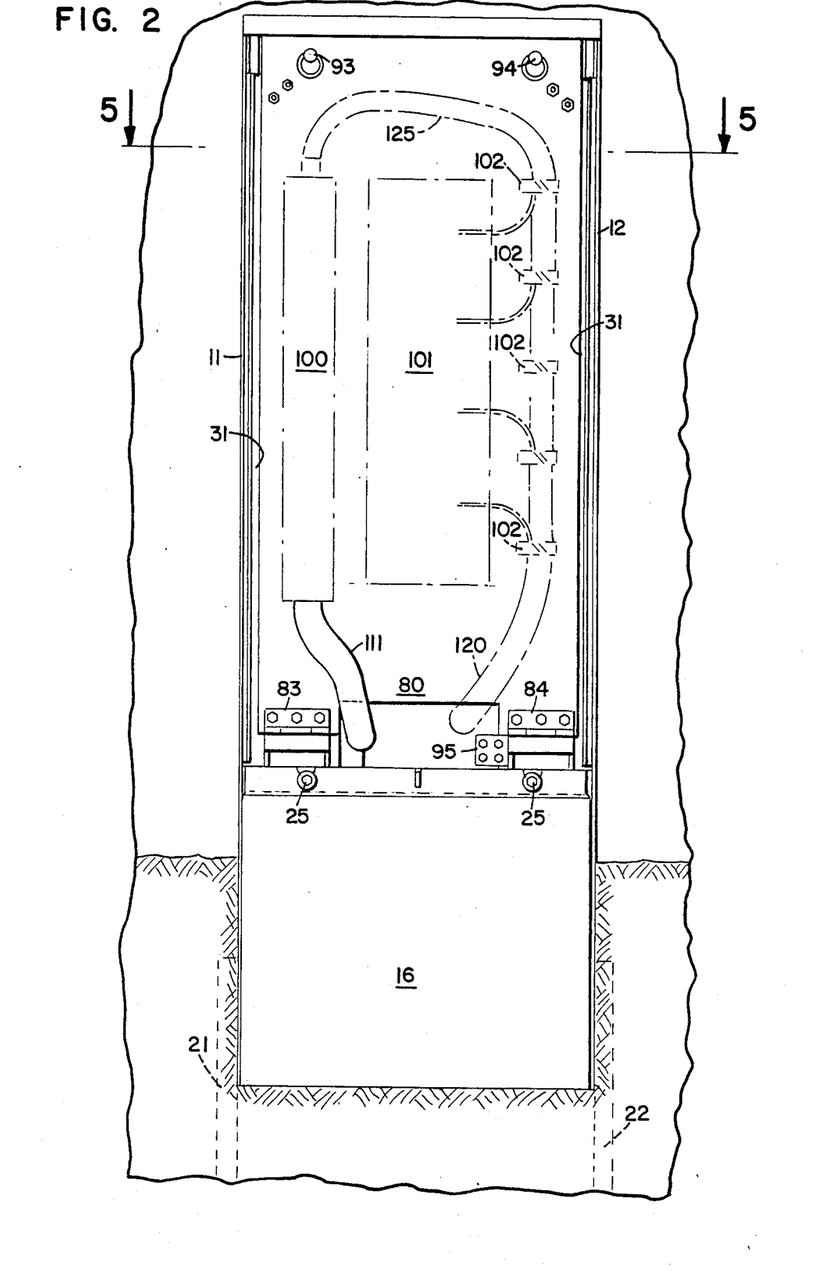
FIG. 2 is a view partially in vertical section and partially in front elevation of the cabinet of FIG. 1, portions thereof removed for illustration purposes.

A typical installation is indicated in FIGS. 2, 3 and 4. In FIG. 2, broken line 100 indicates a lightning protector block which is commonly provided in a telephone service entrance terminal. It is secured to mounting plate 80. The ground wire for protector 100 can connect to ground plate 95 as previously indicated. Also mounted on mounting panel 80 is a terminal assembly 101 indicated in broken line. A number of jumper ring assemblies 102 are also positioned to aid in positioning wiring running to and from the terminal assembly.

As seen in FIG. 4, the buried telephone company feeder cable 110 comes up in through the bottom of the terminal housing and passes up behind mounting panel 80 into an area which becomes the splice chamber. The cable stub input to protector 100 is indicated by reference number 111, and passes below the lower edge of mounting panel 80, under a cutout provided for that purpose, and into the splice chamber, where it is joined at splice 112 to cable 110. A number of tie posts 115 are provided along both sides of back panel 14, as seen in FIG. 3, and these serve as convenient anchor points for cable ties for holding the cables and splices in position. The cabling and wiring from the building is brought into the splice chamber through the offset opening 46 and routed down under the opening at the bottom edge of mounting panel 80. If the cables are not long enough and splices are necessary, they are positioned in the splice chamber. The cabling from the building is indicated by reference number 120 in FIG. 2, and is brought up through jumper ring assemblies 102 and fanned into the appropriate places in the terminal assembly 101. The output cable 125 of protector 100 is also routed through jumper ring assemblies 102 and wires are fanned into the appropriate locations in terminal assembly 101, where the appropriate connections are made for connecting telephone service within the building to the central office.

It will thus be seen that the present invention provides an improved universal building entrance terminal that is modular in construction, provides ease of access for adding or changing connections therein, and which has multiple and adjustable openings for easy alignment during installation with cable entrance openings provided in buildings.

What is claimed is:

1. A universal building entrance terminal, for placement adjacent a cable outlet opening in a building wall to facilitate wiring interconnection therewith, comprising:

a substantially weatherproof housing having at least one access opening in a wall thereof for positioning adjacent a building to provide access for wires and cables;

said housing having a base portion adapted to be placed on the ground and partially embedded or buried therein and having an at least partially open bottom for receiving the end of a buried cable;

said housing having a service door and means for securing said door in place on said housing to form a substantially weatherproof enclosure;

an access cover, said cover having a cable receiving opening therein surrounded by a flange extending outwardly therefrom, said flange and cable receiving opening placed in an offset position in said access cover; and means for mounting said access cover on said housing over said access opening, in one of a plurality of different orientations to vary the position of the offset flange and cable receiving opening to permit alignment with a cable outlet opening in a wall of a building, said flange for abutting the wall of a building and said cable receiving opening for receiving wires or cables from the cable outlet opening of the building, whereby interconnections can be made between wiring from the building and the buried cable.

2. Apparatus according to claim 1 including a plurality of said access covers having flanges of different lengths, whereby different mounting distances from the building entrance terminal and a building wall can be accommodated.

3. Apparatus according to claim 1 further including bolts or screws for securing the wall of said housing having said access opening to the adjacent wall of a building, and standoff spacers having a length corresponding to the length of said flange of said access cover for fitting over said bolts or screws between the wall of said housing and the wall of the adjacent building.

4. Apparatus according to claim 1 wherein said access cover is rectangular, wherein said flange and cable receiving opening are positioned offset from the center toward a corner thereof, and wherein said means for mounting is adapted for mounting said access cover in one of four different orientations whereby to provide four different choices in positioning of the flange and cable receiving opening.

5. Apparatus according to claim 1 wherein said housing has a plurality of access openings in a wall thereof at different heights for alignment with cable outlet openings at different heights in building walls, wherein said access cover can be mounted on a selected one of said access openings, and wherein the remainder of said plurality of access openings are normally covered by closure plates.

6. Apparatus according to claim 1 further including gasket means on said flange of said access cover for sealing to the adjacent wall of the building.

7. Apparatus according to claim 1 wherein said housing has a knockout or selectively removable cover panel on a side thereof adjacent the wall which has the access opening, for selectively opening an interconnect opening to permit interconnection between a pair of said universal building entrance terminals when mounted side by side.

8. Apparatus according to claim 7 wherein said housing has said knockouts or selectively removable cover panels on both sides thereof adjacent the wall which has the access opening, for selectively opening interconnect openings to permit interconnection between two or more of said universal building entrance terminals when mounted side by side.

9. Apparatus according to claim 1 wherein said service door is completely removable from said housing for permitting service access to the interior of said housing.

10. Apparatus according to claim 1 further including a component mounting panel hingeably secured within said housing for folding outwardly when said service door is opened to permit service access to wiring or components within said housing.

* * * * *